Patented Feb. 24, 1931

1,793,967

UNITED STATES PATENT OFFICE

WILLI SCHULTZE, OF HALLE-ON-THE-SAALE, GERMANY, ASSIGNOR TO A. SCHULTZE & CO. OELFABRIK, OF HALLE-ON-THE-SAALE, GERMANY, AND HERMANN SCHUBERT, TEXTILWERKE, OF ZITTAU IN SAXONY, GERMANY

METHOD OF REFINING NATURAL AND ARTIFICIAL RESIN

No Drawing. Application filed November 7, 1927, Serial No. 231,775, and in Germany September 23, 1927.

In the resin-employing industries, there is an important demand for light-coloured resins. At present these can only be obtained from the resin balsam from the living tree (for instance colophony). The resins obtained by extraction from dead wood are well known to be red-brown to bright ruby red, in any case not so light in colour as the lighter types obtained from the living tree. Hitherto no technical means have been discovered for refining, more especially with a view to lightening the colour of resins extracted from the dead wood.

The invention is concerned with and solves this problem.

The new method consists in this that the colophony obtained by extraction from the dead wood is subjected to distillation in high vacuum of 8 millimeters pressure or less.

According to Houben "Methoden der organischen Chemie" Leipzig 1921, volume 1, page 547 seq. "high vacuum" implies according to German science a pressure of 8 millimeters and less.

In this case there is a yield of at least 80% of quite light-coloured resin, and a residue in the retort which in its turn shows valuable properties as compared with the initial product.

Example 1000 kgs. of a colophony obtained from dead wood by extraction and distillation according to known methods, are distilled with or without using fractionating elements in a high vacuum, i. e. such a vacuum that about 80–85% of the distillate distil over for the most part at 230 to 255° C., measured as vapour, this vacuum or absolute pressure being not more than 8 millimeters.

The distillate obtained in this way shows a light colour, a dropping point (according to Übbelohde) of 71° C., an acid number of 169 and a content of 8.3% of unsaponifiable matter. The residue remaining in the retort shows a somewhat darker colour than the primary material, a dropping point of 131° C., an acid number of 117 and a content of 9.5% of unsaponifiable matter. The initial material has a red-brown colour, a dropping point of 76° C., an acid number of 151 and a content of 7.1% unsaponifiable matter.

It is obvious from the figures given that no decomposition of the initial material has taken place, which is of fundamental importance for the economy of the process. The total yield of usable products is almost theoretical. The residue left in the retort has the character of hard resin and therefore also its properties.

What I claim is:—

A method of refining wood-rosin, said rosin having been obtained from dead trees, said method including the steps of distilling the wood-rosin in high vacuum of 8 millimeters mercury column and less in the absence of foreign gases.

In testimony whereof I have signed my name to this specification.

WILLI SCHULTZE.